United States Patent [19]

Herbert et al.

[11] 4,084,785
[45] Apr. 18, 1978

[54] BALL VALVE WITH LINEAR ELASTOMERIC SEAL MOUNTING

[75] Inventors: John T. Herbert, Arlington; Paul E. Sullivan, Euless, both of Tex.; Stanley P. Vitt, Jr., Redlands, Calif.

[73] Assignee: Murdock Machine & Engineering Company of Texas, Irving, Tex.

[21] Appl. No.: 712,515

[22] Filed: Aug. 9, 1976

[51] Int. Cl.² .................. F16K 41/00; F16K 3/22
[52] U.S. Cl. .................. 251/172; 137/625.47; 251/174; 251/315; 251/214
[58] Field of Search .............. 251/172, 174, 175, 315, 251/317, 214, 335 R, 335 A, 335 B; 137/625.47

[56] References Cited

U.S. PATENT DOCUMENTS

| | | | |
|---|---|---|---|
| 2,365,752 | 12/1944 | Edwards | 137/509 X |
| 3,100,499 | 8/1963 | Bass | 251/172 X |
| 3,472,270 | 10/1969 | Mashedes | 251/174 X |
| 3,567,176 | 3/1971 | Johnson | 251/335 B |
| 3,580,540 | 5/1971 | Heinen | 251/172 X |

*Primary Examiner*—Alan Cohan
*Attorney, Agent, or Firm*—Richards, Harris & Medlock

[57] ABSTRACT

A ball valve where a housing with inlet and outlet ports encompasses a ported gate having spherical surfaces and mounted for rotation about an axis perpendicular to one of the ports. A linear spring assembly seals the ported gate and includes a structure supported seal ring contoured to mate with the spherical surface of the gate and mounted by means of an elastomeric cylindrical element responsive to pressure in the housing to control the contact force between the ported gate and the sealing ring, and with an elastomeric seal ring concentric to the axis of rotation.

14 Claims, 6 Drawing Figures

BALL VALVE WITH LINEAR ELASTOMERIC SEAL MOUNTING

This invention relates to a ball valve for controlling the flow of fluid, and more particularly to a provision of a linear spring mounted sealing structure for establishing sealing contact with the spherical surface of a ported gate element.

In prior art systems, valve seals have been found to deteriorate very rapidly due to the travel of high velocity fluid past the ball seal. Vibration in the seal area also aggravates wear. When exposed to corrosive fluids, stem seals and bearings are adversely affected and afforded very short life characteristics.

The present invention is directed to overcoming the problem above noted as present in prior art devices. The invention involves a simplified structure and incorporates a unique ball seal that is mounted on an elastomeric shear mount. The mount loads the seal with a force that is proportional to line fluid pressure and thus permits compensating seal loading from varying internal fluid pressures. It also accommodates ball deflections that result from loads caused by high differential pressures. Thus, the present invention is directed to a unit which is characterized by long life in very corrosive and/or high pressure fluid environments.

An elastomeric supported seal can sustain vibrations caused by the flow of high velocity fluids. Elastomeric support provided in accordance with the present invention also delivers a constant force-deflection characteristic on the seal loading surface and accommodates small distortions due to mechanical deflections. Differential loading in the seal in accordance with the present invention is controlled by differential diameters on the seal assembly.

The stem seal in accordance with the present invention is further accomplished through the use of an elastomeric/metallic flexible element capable of torsional movement. The resulting dynamic seal has no contacting or wear surfaces since motion is simply rubber placed in shear and thus no friction or leakage can occur. Fluid media flowing through the valve is contained outside the seal so that low torque operation and long life are obtained.

More particularly in accordance with the present invention, there is provided a ball valve in which a housing is provided with a ported gate which has spherical surfaces and is mounted in the housing for rotation about an axis perpendicular to the axis of one of the ports. A linear spring assembly is provided to seal against the ported gate and includes an elastomeric cylindrical element resiliently supported from the housing in manner such that pressures control the contact force between the seal ring and the ported gate.

In a further aspect, a torsional elastomeric seal is provided to protect bearings or bushings mounting the ported gate from contact with fluids passing through a valve.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIG. 3 is a side view, partially in section, of a three-way ball valve;

FIG. 4 is a sectional view taken along line 4—4 of FIG. 3;

Figure 1:
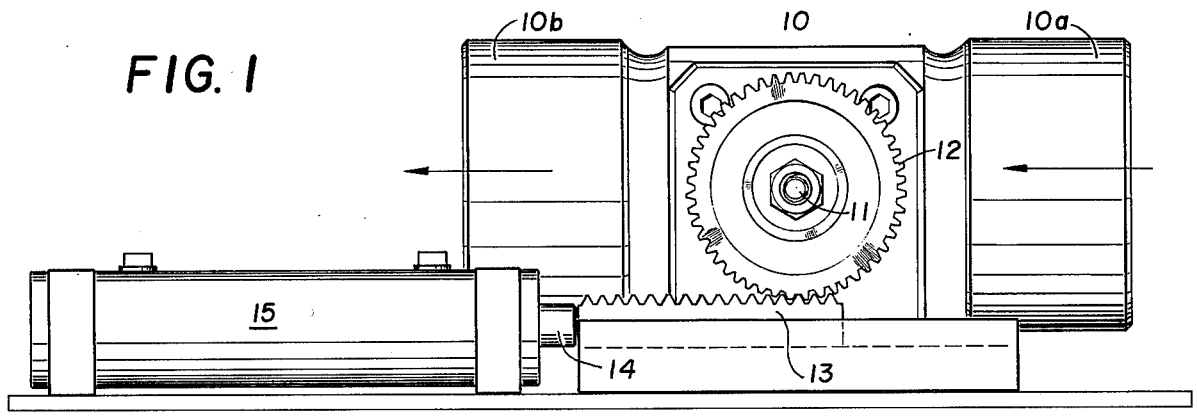
FIG. 1 is a side view of a power actuated single port through valve.

Referring to FIG. 1, a ball valve 10 has a generally cylindrical housing from which there extends a valve stem 11.

A pinion 12 mounted on valve stem 11 is driven by a rack 13 which is connected to a piston 14 of a hydraulic cylinder 15.

In this form cylinder 15 may be actuated remotely to open and close the flow path in valve 10. In the form shown in FIG. 1, flow normally would be from the input end 10a to the output end 10b, the ends being provided with suitable structure for accommodating attachment to a supply line and a receiving line.

Figure 2:
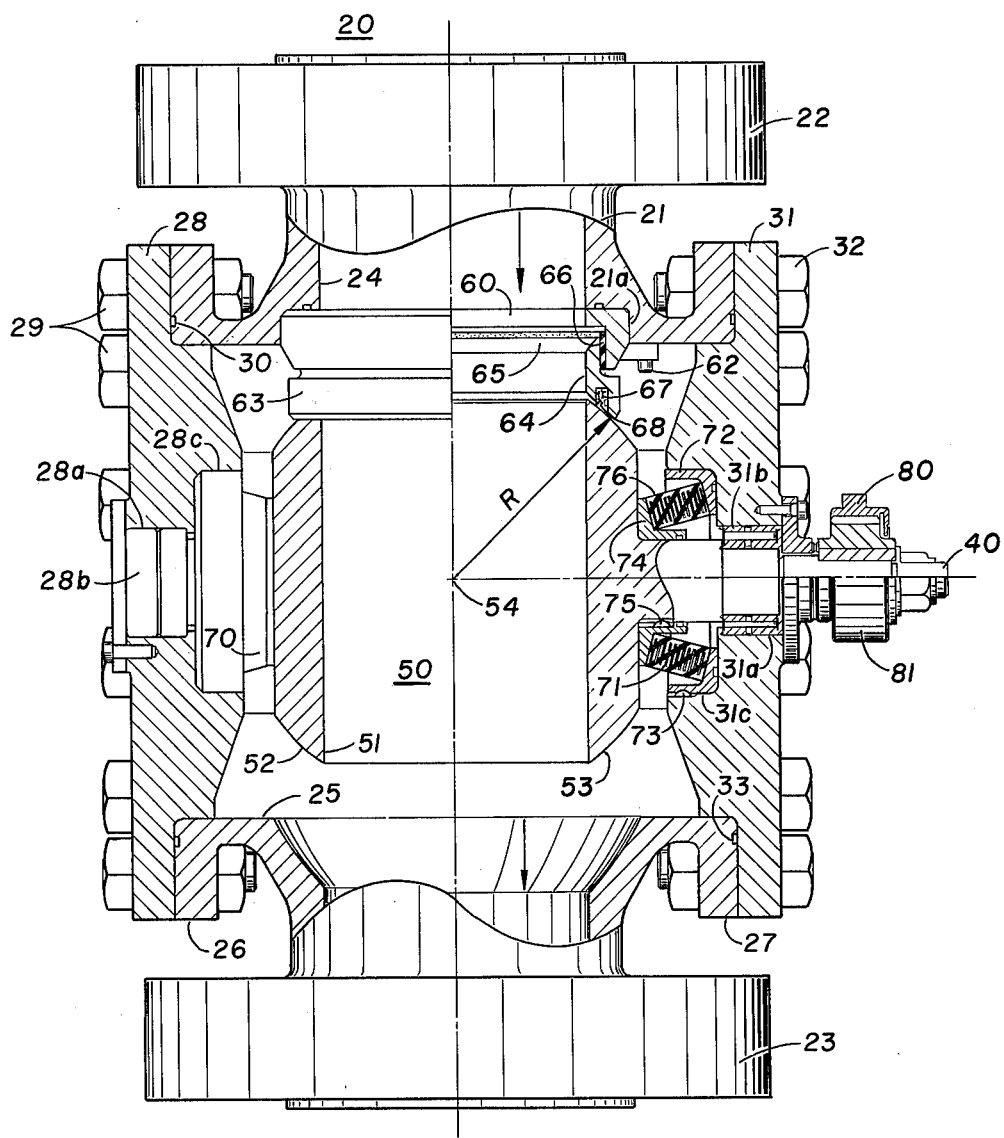
FIG. 2 is a top view, partially in section, of a valve typical of that shown in FIG. 1.

FIG. 2 illustrates a ball valve 20, embodying the invention, which in one application where particulate matter is transported was positioned with its flow axis vertical to assure gravity cleaning of the particulate matter while assuring a seal in the closed position. Valve 20 comprises a housing 21 having an input flange 22 and an output flange 23. Housing 21 has a cylindrical bore 24 extending therethrough coaxial with flanges 22 and 23 which forms the flow path for fluids which are to pass through valve 20. Housing 21 is enlarged in the center portion and has a transverse cylindrical bore 25 extending therethrough. Flanges 26 and 27 face outwardly at the mouth of bore 25. An end plate 28 closes bore 25 as it is secured to flange 26 by bolts 29 and is sealed thereto by O-ring 30.

A second end plate 31 closes bore 25 as it is secured to flange 27 by bolts 32 and is sealed thereto by O-ring 33.

End plates 28 and 31 have aligned central ports 28a and 31a coaxial with bore 25. A valve stem 40 is journaled in bearings 28b and 31b mounted in ports 28a and 31a, respectively. Ports 28a and 31a are reentrant to form large diameter wells 28c and 31c.

Valve stem 40 is integral with a ball 50 through which a bore 51 extends. Bore 51 is perpendicular to stem 40 and is of the same diameter as bore 24. Ball 50 has surface segments 52 and 53 which are spherical with reference to the center point 54 which lies on the axis of valve stem 40 and on the axis of bores 24 and 51.

When ball 50 is in the position shown, the flow passage comprising bores 24 and 51 is unimpeded. When ball 50 is rotated 90° by actuating valve stem 40, the flow channel is closed and, in accordance with the present invention is positively sealed. Sealing action is actuated by cooperation of three structures in housing 21.

The first sealing structure comprises a seal assembly mounted coaxial with bore 24 at the inlet side of the valve and contacting the surface of ball 50. More particularly, the seal assembly includes a retainer ring 60 which is sealed in a reentrant bore 21a and is secured therein as by screws 62. Retainer ring has a shallow cylindrical well in which is nested a seal seat 63.

Seal seat 63 is a metallic ring having a central bore 64 which is coaxial with bores 24 and 51. The upper end 65 of bore 64 is conical. The upper portion of the outer surface of the seal seat 63 is cylindrical in section with the walls being parallel to cylindrical in-facing walls of retainer ring 60. An elastomeric ring 66 serves to secure seal seat 63 nested in the retainer ring 60. Ring 66 is bonded along its entire length to both ring 60 and seat 63 to insure sealing integrity.

The bottom surface of the seal seat 63 is conically contoured and has an annular vertically extending cylindrical recess 67 therein with a sealing ring 68 nested therein. The lower surface of the sealing ring 68 is spherically contoured and registers with the spherical surfaces 52 and 53 of the upper reaches of the ball 50. The seal ring 68 is of non-metallic material preferably such as a tetra-fluro-ethylene polymer commonly available under the trademark Teflon. O-rings on the inside and outside walls of ring 68 maintain a sealing relation in the annular recess 67.

The second and third sealing structures are identical. They comprise elastomeric assemblies 70 and 71. Seal 70 is shown in elevation. Seal 71 is shown in cross-section. They are identical so that only the elastomeric seal 71 will be described in detail. Elastomeric seal 71 comprises a shallow ported cup 72 which is nested in the reentrant opening 31c and is locked in that position against rotation about the axis of the valve stem 40 by a torsion key 73. In a similar manner, a flanged washer 74 is mounted on the valve stem 40 abutting the truncated surface of the ball 50. It is locked in position against rotation relative to the valve stem by a torsion key 75.

Elastomeric conically shaped torsional elastomeric seal ring 76 is bonded to the inner surface of the cup 72 and the outer surface of the flanged washers 74 so that it effectively forms a fluid tight seal protecting the valve stem 40 from any pressurized fluids passing through flow channels 24, 64 and 51. The elastomeric seal ring 76 comprises a stack of thin structural washers integrated into a conically shaped rubber body. Bonds between the rubber and washers permit ball 50 to be rotated by actuating a rack 80 meshing with pinion 81 which in turn is keyed to the valve stem 40. The torsional elastomeric rings 70 and 71 may be positioned by torsion keys 73 and 75 to be unstressed when the valve is open. Alternatively they may be initially positioned so that the elastomeric members 70 and 71 are unstressed when the valve is closed or they may be positioned at any angle between the open and closed positions.

From the foregoing it will be seen that the torsional elastomeric assemblies 70 and 71 serve to seal the bearings 28b and 31b against the ingress of media flowing in the channel 24. The seal ring 68 contacts the spherical surface of ball 50 in a plane parallel to the axis of the bore 51 when in the closed position to provide a complete seal against ingress of media from bore 24. As ball 50 rotates, the seal is broken as the mouth of the bore 51 moves from engagement of the ring 68. When in full open position, the ring 68 again is in full annular contact with the spherical surface of ball 50.

In accordance with the present invention, the mounting thus described permits the seal ring 68 to contact ball 50 with a preload compression. More particularly, the elastomeric ring 66 controls the contact force between the seal ring 68 and ball 50. In initial construction, the geometry is such that the seal seat ring 68 is initially deflected upward by the contact force exerted on the seal ring 68. Further, the seal between ring 68 and the ball 50 is enhanced by pressures applied to the seal seat ring 63 so that it acts as a piston in response to fluid pressure exerted on an upper surface area of the ring 63. The upper surface area is greater than the lower surface area which is also subject to the same pressure. Thus, the sealing ring is pressure loaded as well as resiliently loaded into the ball 50 to provide a sealing force at all times with and without fluid pressure with force increasing with pressure.

Figures 3, 4:
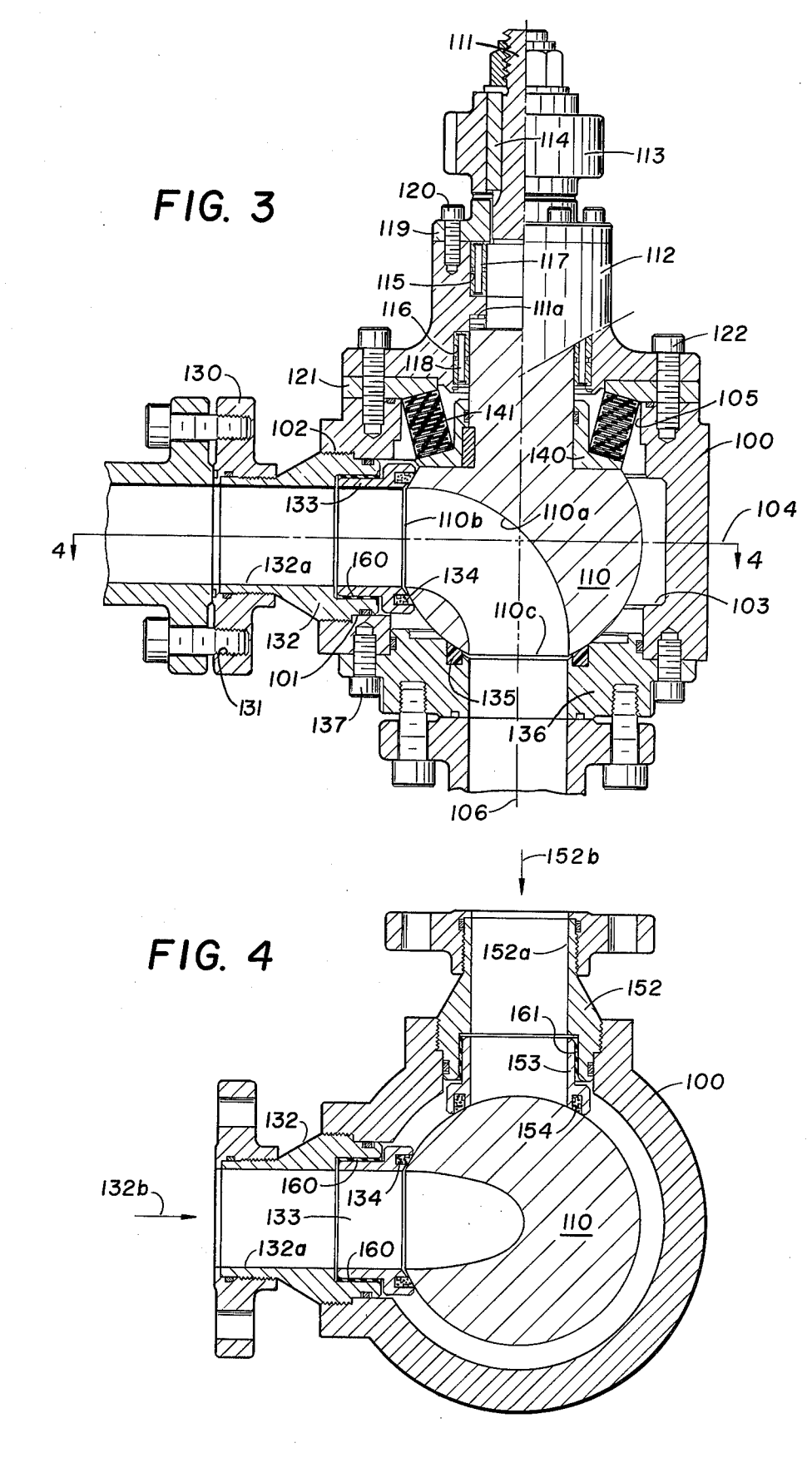

FIGS. 3 and 4 illustrate a threeway ball valve in which fluid flow is diverted from either of two inlet channels through an angle of 90° as it passes through the ball element.

In FIG. 3, housing 100 has first inlet bore 101 having a threaded inlet section 102. Bore 101 is reentrant and has a smaller bottom section 103. Bore 101 is centered on axis 104. A second bore 105 extends through housing 100 centered on axis 106 which is perpendicular to axis 104. A ball 110 integral with the valve stem 111 is journaled for rotation in a closure flange 112. A pinion gear 113 secured to valve stem 111 by key 114 is provided for actuating ball 110. Flange 112 has an enlarged bore 115 entering from the top and an enlarged bore 116 entering from the bottom. Bore 116 is larger than bore 115. Needle bearings 117 and 118 are mounted in bores 115 and 116, and serve to journal the valve stem 111. A thrust bearing 111a comprises a pair of washers sandwiching a set of cylindrical rollers. Bearing 111a opposes movement of valve stem 111 outward of housing 100. A cap 119 is secured to the flange unit 112 as by screws 120. A torsional elastomeric seal seating ring 121 is mounted at the mouth of bore 105 and is secured to housing 100 along with the unit 112 by screws 122. The bore 105 is large enough to permit insertion of ball 110 therethrough once the ball, the valve stem 111, bearings 117, 118 and 111a are all assembled on flange 112.

Ball 110 has a curved port 110a extending therethrough, passing through an angle of 90° and having an inlet 110b and an outlet 110c.

A first linear seal assembly is mounted in the bore 101. It comprises a flange 130 which serves to accommodate connections to a supply pipe line with bolts passing through holes 131 into a mating flange. Flange 130 is screwed onto a threaded section of the seal assembly retainer 132 which is threaded into the threaded section 102 of the bore 101. An elastomeric ring 160 is bonded between retainer 132 and seal seat support ring 133 to provide a positive pressure seal. The seal seat support ring 133 is cylindrical in shape and is hollow with the port therethrough corresponding with the bore 132a and the bore 110a. A seal set ring 134 is mounted in an annular cylindrical groove in the end of seat support ring 133 facing ball 110.

A non-sealing bumper 135 is mounted in an annular groove symmetrical to axis 106.

The bumper ring 135 is mounted in a closure plate 136 which serves to close the lower end of the bore 105. Plate 136 is secured to housing 100 by screws 137.

O-rings are provided throughout the structure in order to provide seals between stationary parts.

A flanged washer 140 is mounted on the valve stem 111 next adjacent the ball 110 and is keyed to the valve stem 111 to prevent rotation relative to the valve stem 111. A conically shaped hollow elastomeric ring 141 is adhered to the face of washer 140 at one end thereof and is adhered to the face of the washer 121 at the other end. The torsional elastomeric seals are each comprised of a stack of conical reinforcing washers of successively increasing diameter with distance away from ball 110 and thin layers of rubber therebetween which bonds are established so that the ball 110 may be rotated 90° from the position shown in FIG. 3, thereby to provide a seal closing the valve and preventing flow from the inlet bore 132a. At the same time, the torsional elastomeric seat 141 serves to protect bearings 117 and 118.

FIG. 4 is a view taken along the lines 4—4 of FIG. 3. In addition to the sealing ring 134 and the mounting thereof detailed in FIG. 3, FIG. 4 reveals that the valve has a second inlet channel 152a which extends through a seal assembly retainer 152. Retainer 152 supports a seal seat ring 153 which in turn supports a second seal seat ring 154. As best shown in FIG. 4, the seal seat support ring 133 is resiliently bonded to a rubber body 160 as is the seal assembly retainer 132. Similarly, a rubber ring 161 is bonded to the seal assembly retainer 152 and to the seal seat support ring 153. Thus, the valve of FIGS. 3 and 4 provides for directing flow either through inlet port 132a as indicated by arrow 132b when in the position shown or through inlet port 152a as indicated by arrow 152b when the ball 110 is rotated 90° from the position shown.

Figure 5:
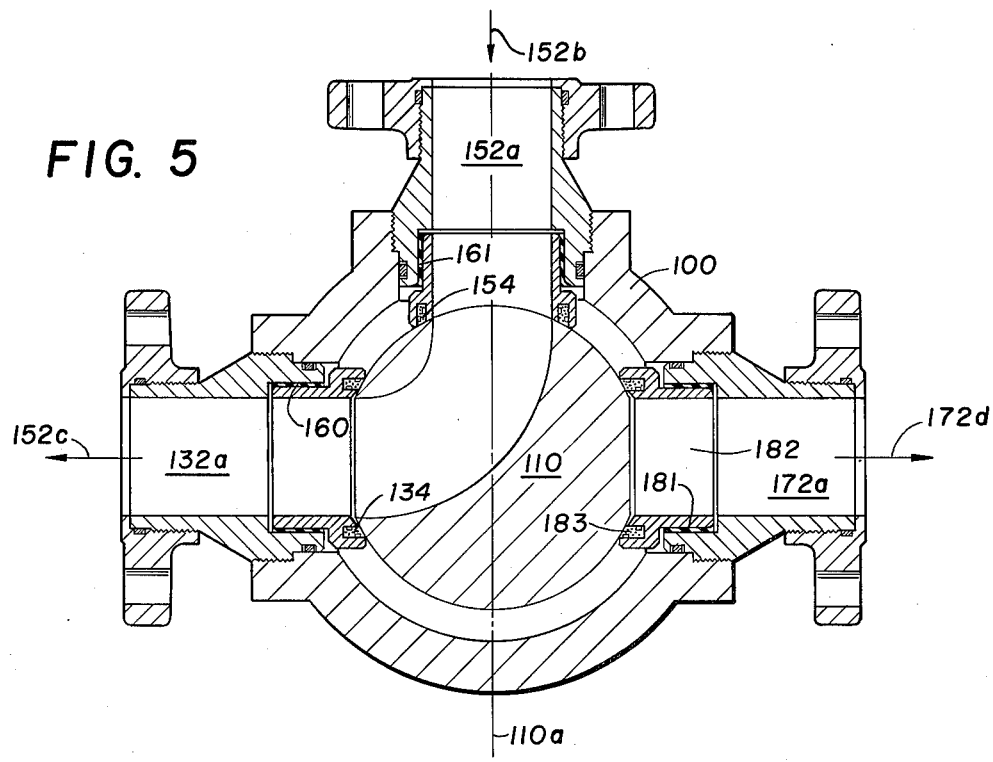
FIG. 5 is a modification of the valve of FIGS. 3 and 4.

FIG. 5 is a modification of the system of FIGS. 3 and 4 in which the flow can be directed from an inlet port to either of two outlets ports and where all of the flow lines are oriented in the same plane. This is in contrast with the system of FIGS. 3 and 4 wherein the ports 132a and 152a are in the same plane but the outlet port through element 136 is 90° from ports 132a and 152a.

Where consistent the same reference characters have been employed in FIG. 5 as in FIG. 4.

In FIG. 5, the port 152a is the inlet port with the elastomeric linear spring 161 supporting the sealing ring 154. The linear spring 160 similarly supports the sealing ring 134. The ball 110 has a port extending therethrough which passes through 90° and is in the same plane as the flow channels 132a and 152a. In the position shown, flow in the direction of arrow 152b would emerge from the valve in accordance with the arrow 152c. The housing 100 has a second outlet port 172a with a linear spring 181 supporting a seal seat 182 which in turn supports the sealing ring 183. Thus, the ball 110 may be rotated about an axis perpendicular to axis 110a to shift the flow entering in accordance with arrow 152b to exit in the direction of arrow 172d. The valve of FIG. 5 is similar to the valve of FIGS. 3 and 4 except the three lines leading thereto are in the same plane.

It will be apparent that still a fourth line could be provided on the structure of FIG. 5 thereby to further enhance the utility of the valve in multiport multistream operations.

Figure 6:
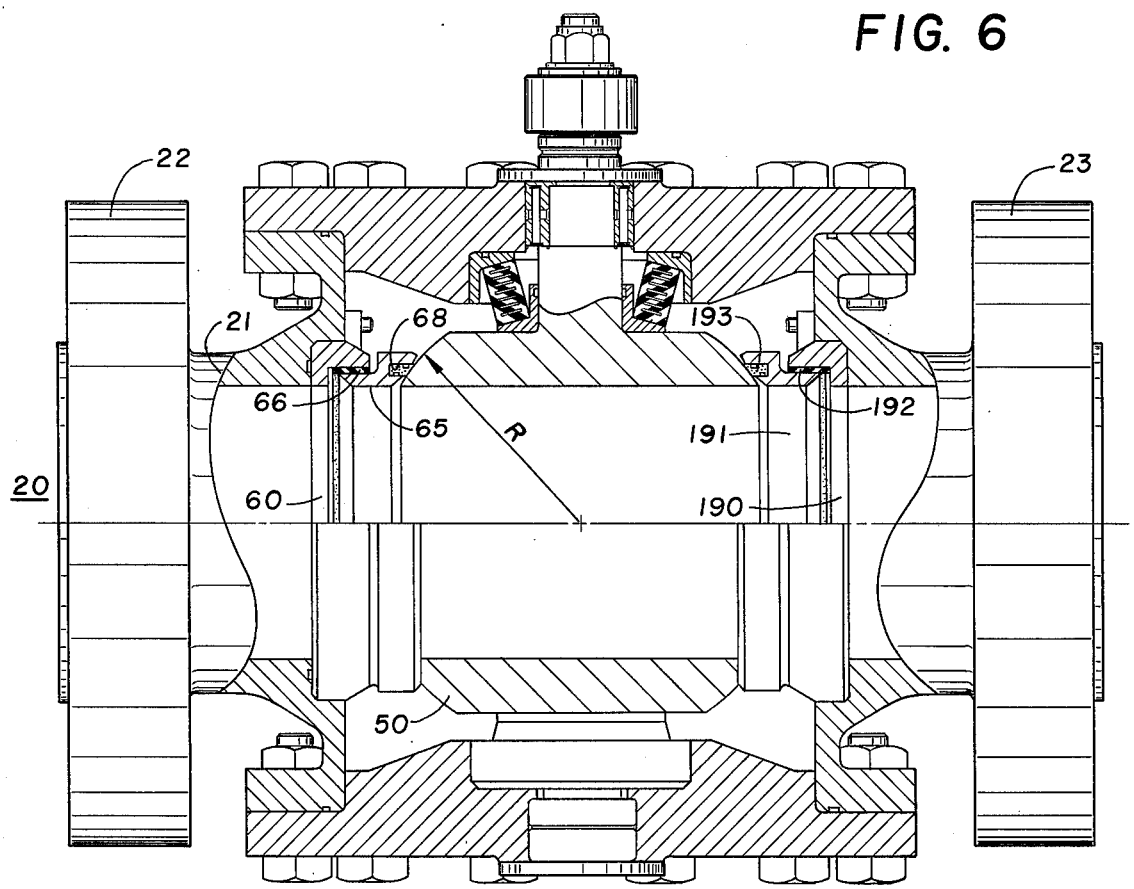
FIG. 6 illustrates a modification of the valve of FIG. 1.

In FIG. 6, the valve of FIG. 2 has been illustrated but with the same structure on both sides of the ball 50. More particularly, the ring 60 is mounted as in FIG. 2 supporting seat 65 by means of the linear spring 66 so that the sealing ring 68 is maintained in contact with the surface of the ball 50. In a similar manner, a ring 190 supports a seal seat 191 by means of a linear spring 192. A sealing ring 193 then makes contact with the ball at a location diametrically opposite to the contact by ring 68.

The structure shown in FIG. 6 generally will be preferred over that shown in FIG. 2 inasmuch as a smooth flow channel is maintained through the system, minimizing turbulence. As explained above, the structure shown in FIG. 2 was for a special environment wherein particulate matter was being transported and flow vertically through the valve would maintain the area below the ball scoured and free from debris. However, in a more general case, the structure of FIG. 6 will be preferred.

Thus, in accordance with the present invention, a ball valve is provided with a housing having an input and output port and containing a gated port having spherical surfaces mounted for rotation about an axis perpendicular to the axis of one of the ports. A rigid ring is mounted coaxially of the input port with a sealing face ring contoured to mate with the spherical surface of the gate. An elastomeric element bonded between the outer surface of the rigid ring and an inner surface of the housing structure is responsive to internal valve pressures to control the contact force between the ported gate and the resilient ring. A valve stem extends through the housing. The cup facing the gate is nested in the housing concentric with the axis of a valve stem and is anchored against rotation about the axis of the valve stem. A washer encircling the valve stem is locred against rotation relative to the valve stem faces the inner surface of the cup. A generally cylindrical elastomeric seal is bonded to the inner surface of the cup and the outer surface of the washer to provide protection for the valve stem as the ported gate rotates out of sealing contact with the sealing face rings.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a ball valve where a housing with input and output ports containing a ported gate having spherical surfaces mounted for rotation about an axis perpendicular to the axis of one of said ports, the combination comprising:
   (a) a retainer ring fixedly mounted coaxially of said input port,
   (b) a rigid ring with a sealing face ring contoured to mate with said spherical surface of said gate, said rigid ring and sealing ring being responsive to internal valve pressure to increase the contact force between said sealing ring and said ported gate, and
   (c) an elastomeric element bonded between the outer surface of said rigid ring and an inner surface of said retainer ring, said elastomeric element permitting the movement of said sealing ring relative to said ported gate in response to internal pressure in the valve.

2. The combination set forth in claim 1 in which the surface area of said ring facing said ported gate and exposed to fluid pressure in said inlet port is smaller than the surface area of said ring facing away from said ported gate and exposed to said pressure for producing piston action in urging said sealing face ring onto said ported gate.

3. The combination set forth in claim 1 in which said rigid ring is mounted in said retainer ring by said elastomeric element with an interference fit relative to said ported gate initially to stress said elastomeric element and thereby exert a biasing force on said sealing ring urging it against said ported gate.

4. The combination set forth in claim 1 in which said elastomeric element is a thin cylinder coaxially mounted in said inlet port.

5. A ball valve which comprises:
   (a) a housing with an input and output port and a chamber therein, (b) a ported gate having spherical surfaces mounted in said chamber for rotation about an axis perpendicular to the axis of one of said ports,
(c) a linear spring assembly including:
  (i) a retainer ring fixedly mounted coaxially in said one of said ports,
  (ii) a rigid ring with a sealing face ring contoured to mate with said spherical surface of said gate positioned coaxially in said retainer ring, said rigid ring and sealing ring being responsive to internal valve pressure to control the contact force between said sealing ring and said ported gate, and
  (iii) an elastomeric cylindrical element bonded between the outer surface of said rigid ring and the inner surface of said retainer ring, said elastomeric element permitting the movement of said sealing ring relative to said ported gate in response to internal pressure in the valve.

6. The combination set forth in claim 5 in which said ported gate has a valve stem extending therefrom with bearings mounted in said housing journaling said valve stem and an elastomeric torsional seal positioned between said bearings and said flow channel.

7. In a ball valve where a ball mounted on a valve stem is to be rotated to selectively open and close a flow passage through the valve structure, the combination which comprises:
(a) a valve stem extending from said ball through a port in said housing for rotating said ball,
(b) a cup facing said ball nested in said housing concentric with the axis of said valve stem and anchored against rotation about said axis,
(c) a washer encircling said valve stem and locked against rotation relative to said valve stem and having a surface confronting the inner surface of said cup, and
(d) a generally cylindrical elastomeric seal bonded to the inner surface of said cup and to the outer face of said washer.

8. The combination set forth in claim 7 in which a set of bearings are mounted in said housing outside of said cup to support said valve stem as it passes through said housing.

9. The combination set forth in claim 7 in which an inlet port and an outlet port in said valve structure are positioned along said flow passage and in which two linear spring assemblies are provided for opposed contact with said ported ball adjacent each of the inlet port and the outlet port.

10. The combination set forth in claim 5 in which a second linear spring assembly is provided in the second of said input port and said output port.

11. The combination set forth in claim 5 in which a third port is provided in said housing and in which at least two of said linear spring assemblies are provided, one for each of two of said ports.

12. The combination set forth in claim 5 in which a third port is provided in said housing and in which three of said linear spring assemblies are provided, one for each of said ports.

13. The combination set forth in claim 5 in which a third port is provided in said housing with the axis thereof in the same plane as the axes of said input and output ports.

14. The combination set forth in claim 5 in which a third port is provided in said housing with the axis thereof in a plane perpendicular to the plane, to the axes of said input and output ports.

* * * * *

UNITED STATES PATENT AND TRADEMARK OFFICE
CERTIFICATE OF CORRECTION

PATENT NO. : 4,084,785

DATED : April 18, 1978

INVENTOR(S) : John T. Herbert, Paul E. Sullivan and Stanley P. Vitt, Jr.

It is certified that error appears in the above-identified patent and that said Letters Patent are hereby corrected as shown below:

In the Drawings, Figure 5, change numeral "110a" to --110d--.

Column 3, lines 11-12, change "spherical surfaces" to --surface segments--.

Column 3, line 19, change "Seal" to --Elastomeric assembly--;

Column 3, line 20, change "Seal" to --Elastomeric assembly--.

Column 3, line 21, change "seal" to --assembly--.

Column 3, line 22, change "seal" to --assembly --.

Column 3, line 24, change "opening" to --diameter well--.

Column 3, line 35, change "flow channels" to --bores--.

Column 3, line 41, change "rings" to --assemblies--.

Column 3, line 44, change "members" to --assemblies--.

Column 3, line 51, change "channel" to --bore--.

UNITED STATES PATENT OFFICE
CERTIFICATE OF CORRECTION

Patent No. 4,084,785  Dated April 18, 1978

Inventor(s) John T. Herbert et al.

It is certified that error appears in the above-identified patent and that said Letters Patent are hereby corrected as shown below:

Column 3, line 68, delete "ring".

Column 4, line 2, change "ring" to --seal seat--.

Column 4, line 49, "set" should be --seat--.

Column 4, line 28, change "flange unit" to --closure flange--.

Column 4, line 31, change "unit" to --flange--.

Column 4, line 44, change "bore" to --curved port--.

Column 4, line 52, after "bumper" insert --ring--.

Column 4, line 64, change "washer" to --ring--.

Column 5, line 5, change "seat" to --ring--.

Column 5, line 9, change "channel" to --bore--.

Column 5, line 13, change "rubber body" to --elastomeric ring--.

UNITED STATES PATENT OFFICE
CERTIFICATE OF CORRECTION

Patent No. 4,084,785            Dated April 18, 1978

Inventor(s) John T. Herbert et al.

It is certified that error appears in the above-identified patent and that said Letters Patent are hereby corrected as shown below:

Column 5, line 18, change "port" to --bore--.

Column 5, line 19, change "port" t0 --bore--

Column 5, line 24, "outlets" should be --outlet--.

Column 5, line 26, change "ports" to --bores--.

Column 5, line 28, change "element" to --closure plate--.

Column 5, line 28, change "ports" to --bores--.

Column 5, line 31, change "port 152a" to --bore 152a--.

Column 5, line 32, change "spring" to --rubber ring--.

Column 5, line 33, change "linear spring" to --elastomeric ring--.

Column 5, line 36, change "flow channels" to --bores--.

Column 5, line 42, change "110a" to --110d--.

UNITED STATES PATENT OFFICE
CERTIFICATE OF CORRECTION

Patent No. 4,084,785     Dated April 18, 1978

Inventor(s) John T. Herbert et al.

It is certified that error appears in the above-identified patent and that said Letters Patent are hereby corrected as shown below:

Column 5, line 54, change "65" to --63--.

Column 5, line 54, change "linear spring" to --elastomeric ring--.

Column 6, lines 18-19, "locred" should be --locked--.

Signed and Sealed this

Nineteenth Day of December 1978

[SEAL]

Attest:

RUTH C. MASON
*Attesting Officer*

DONALD W. BANNER
*Commissioner of Patents and Trademarks*